United States Patent
Sharma

(10) Patent No.: US 12,374,143 B2
(45) Date of Patent: Jul. 29, 2025

(54) SYSTEM AND METHOD OF PROVIDING ACCESSIBILITY IN USE OF DIGITAL INK

(71) Applicant: Microsoft Technology Licensing, LLC, Redmond, WA (US)

(72) Inventor: Mrinal Kumar Sharma, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 18/167,201

(22) Filed: Feb. 10, 2023

(65) Prior Publication Data
US 2024/0273935 A1 Aug. 15, 2024

(51) Int. Cl.
*G06V 30/32* (2022.01)

(52) U.S. Cl.
CPC ............ *G06V 30/36* (2022.01); *G06V 30/347* (2022.01)

(58) Field of Classification Search
CPC ................................................ G06V 30/00–43
See application file for complete search history.

(56) References Cited

U.S. PATENT DOCUMENTS

| | | | |
|---|---|---|---|
| 10,748,031 B1* | 8/2020 | Binford | G06T 7/60 |
| 2005/0053269 A1* | 3/2005 | Franke | A61B 5/4082 600/595 |
| 2010/0171754 A1* | 7/2010 | Hatfield | G06V 30/347 345/441 |
| 2018/0032159 A1* | 2/2018 | Pathak | G06V 30/1423 |
| 2018/0064344 A1 | 3/2018 | Nguyen | |
| 2024/0104739 A1* | 3/2024 | Nachum | A61B 5/4088 |
| 2024/0273935 A1* | 8/2024 | Sharma | G06V 30/32 |

FOREIGN PATENT DOCUMENTS

| | | | | |
|---|---|---|---|---|
| CN | 106178261 A | | 12/2016 | |
| CN | 106778456 A | * | 5/2017 | ......... G06F 3/04883 |
| WO | 2005009223 A2 | | 2/2005 | |
| WO | 2021011075 A1 | | 1/2021 | |

OTHER PUBLICATIONS

"AutoDraw", Retrieved From: https://www.autodraw.com/, May 2017, 1 Page.
"PDF Studio 10", Retrieved From: https://www.qoppa.com/pdfstudio/, Mar. 31, 2015, 3 Pages.
(Continued)

*Primary Examiner* — Sean T Motsinger
(74) *Attorney, Agent, or Firm* — NovoTechIP International PLLC

(57) ABSTRACT

A method of and system for providing accessibility for digital ink is carried out by detecting digital ink input on a user interface (UI) screen, the digital ink input being received via a writing instrument used by a user within a given time period; capturing an image of the digital ink input; examining the image of the digital ink input to detect tremors in the user; assigning a level to the tremors based on discontinuities or irregularities in the digital ink input within the given time period; determining based on the level that the digital ink input requires correction; and applying a correction to the digital ink input to correct the digital ink input.

19 Claims, 9 Drawing Sheets

(56) References Cited

OTHER PUBLICATIONS

"Use Correction to draw beautiful lines", Retrieved From: https://medibangpaint.com/en/use/2019/08/use-correction-to-draw-beautiful-lines/, Aug. 1, 2019, 10 Pages.
Kuosmanen, et al., "Let's Draw: Detecting and Measuring Parkinson's Disease on Smartphones", In Proceedings of the CHI Conference on Human Factors in Computing Systems, Apr. 25, 2020, 9 Pages.
Nackaerts, et al., "Technology-Assisted Rehabilitation of Writing Skills in Parkinson's Disease: Visual Cueing versus Intelligent Feedback", In Journal of Parkinson's Disease, Oct. 8, 2017, 8 Pages.
Thomas, et al., "Handwriting Analysis in Parkinson's Disease: Current Status and Future Directions", In Journal of Movement disorders clinical practice, Nov. 1, 2017, pp. 806-818.
Toffoli, et al., "A Smart Ink Pen for Spiral Drawing Analysis in Patients with Parkinson's Disease", In Proceedings of 43rd Annual International Conference of the IEEE Engineering in Medicine & Biology Society, Oct. 31, 2021, pp. 6475-6478.
Zham, et al., "Distinguishing Different Stages of Parkinson's Disease Using Composite Index of Speed and Pen-Pressure of Sketching a Spiral", In Journal of Frontiers in Neurology, Sep. 6, 2017, 19 Pages.
International Search Report and Written Opinion received for PCT Application No. PCT/US2024/013636, May 8, 2024, 12 pages.

\* cited by examiner

SYSTEM AND METHOD OF PROVIDING ACCESSIBILITY IN USE OF DIGITAL INK

BACKGROUND

Many computer devices have the capability to receive digital ink as a form of input. As a result, numerous users have begun utilizing digital ink input as a manner of interacting with a computer device. For example, many users share their thoughts during virtual or in-person meetings by using digital ink to draw or write on a digital whiteboard. The digital ink input may take the form of handwritten strokes, which the device displayed as ink as the strokes are entered. To receive the handwritten strokes, the device provided a writing surface, which could be the same as the display screen. This enables the user to view the digital ink as the user is writing and/or drawing on the surface. A handwritten stroke often begins when a writing instrument lands on the writing surface and ends when the writing instrument is lifted off the writing surface. The writing instrument may be an electronic or non-electronic pen, a stylus, the user's own finger, or any another object used to draw or write on the writing surface.

While using digital ink as a form of input may be beneficial in many situations, current computer applications that offer digital ink as a form of input do not offer accessibility features. As a result, users with disabilities that cause hand tremors may have difficulty using digital ink to draw and/or write on the writing surface. For example, hand tremors may result in unintended discontinuities in drawings or ineligible writing. This makes the process of using digital ink as a form of input very challenging for users who experience hand tremors. As a result, digital ink input is often not used by users suffering from hand tremors.

Hence, there is a need for improved systems and methods for providing accessibility in use of digital ink.

SUMMARY

In one general aspect, the instant disclosure describes a device having one or more processors, and a memory in communication with the processors where the memory comprises executable instructions that, when executed by the processors, cause the device to perform multiple functions. The functions include detecting receipt of a digital ink input on a user interface (UI) screen, the digital ink input being provided by a user; examining the digital ink input to detect a physical disability of the user; assigning a level for the physical disability based on at least one of a number of discontinuities in the digital ink input, a size of the discontinuities in the digital ink input and irregularities in the digital ink input; determining based on the level that the digital ink input requires correction; and automatically applying a correction to the digital ink input to correct the digital ink input.

In yet another general aspect, the instant disclosure describes a method for providing accessibility for digital ink, where the method includes the steps of detecting digital ink input on a UI screen, the digital ink input being received via a writing instrument used by a user within a given time period; capturing an image of the digital ink input; examining the image of the digital ink input to detect tremors in the user; assigning a level to the tremors based on discontinuities or irregularities in the digital ink input within the given time period; determining based on the level that the digital ink input requires correction; and applying a correction to the digital ink input to correct the digital ink input.

In a further general aspect, the instant disclosure describes a non-transitory computer readable medium on which are stored instructions that when executed cause a programmable device to perform functions of detecting receipt of digital ink input on a UI screen, the digital ink input being provided by a user; capturing the digital ink input; examining the digital ink input to detect tremors in the user; assigning a level to the tremors based on the digital ink input; determining based on the level that the digital ink input requires correction; providing the digital ink input to a trained machine-learning model for providing correction to the digital ink input; receiving a corrected digital ink input as an output from the machine-learning model; and providing the corrected digital ink input for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
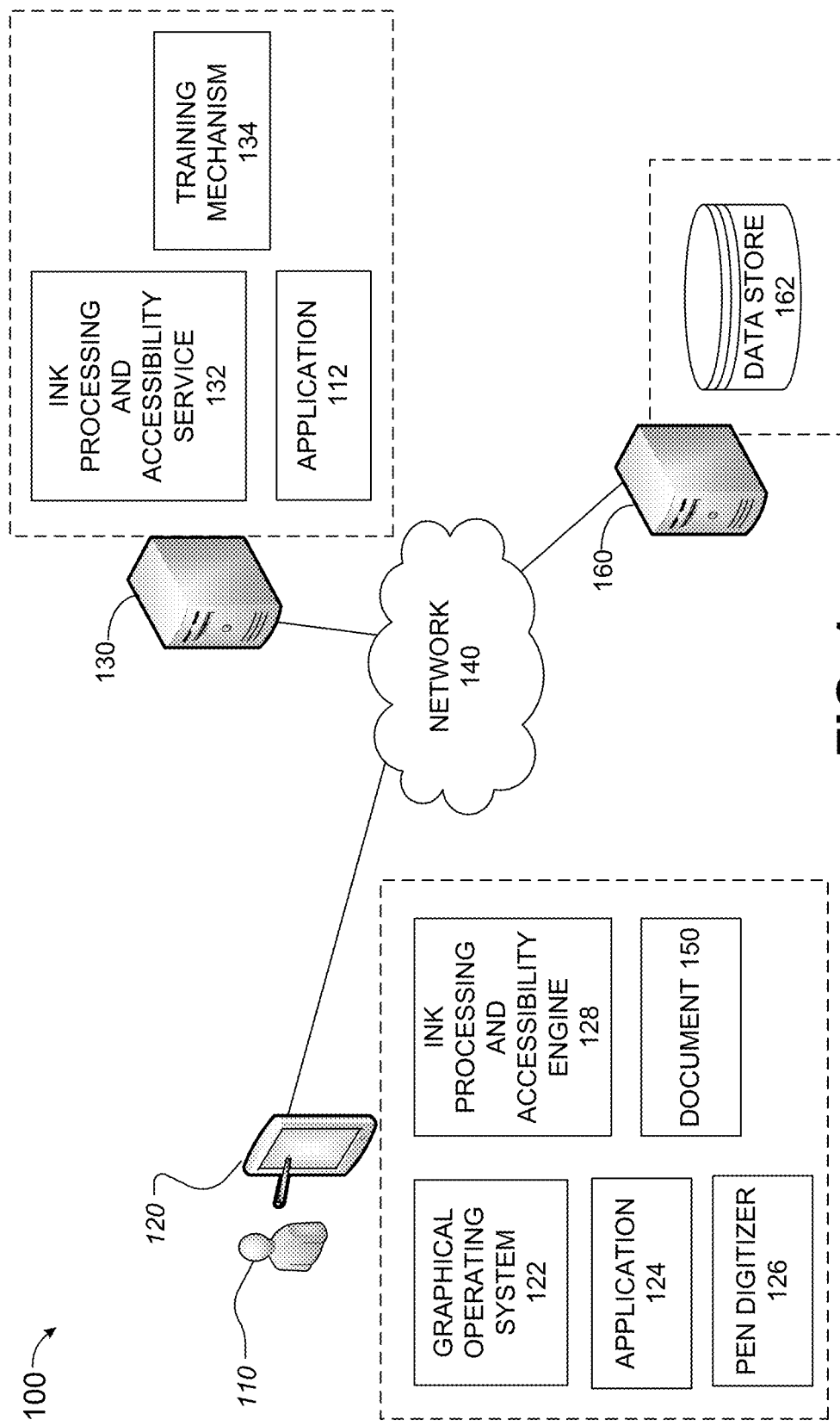
FIG. 1 illustrates an example system environment, upon which aspects of this disclosure may be implemented.

Digital ink has become popular in recent years as a form of input for many computer users. For example, users may utilize digital ink input in a similar manner as that of pen and paper to take notes during a meeting or while reviewing a document, draw a diagram (e.g., during a meeting), highlight a content portion, write a formula, sign and document or perform various other tasks. While the use of digital ink has expanded users' capability and their flexibility in providing input and communicating via an electronic device, these capabilities are not accessible to all users. In particular, users who suffer from hand tremors due to various illnesses may not be able to properly make use of digital ink. For example, users with Parkinson disease often experience shaking and hand tremors that make it difficult to hold a pen steady to write or draw. Furthermore, users with Parkinson diseases tend to make reduced or slow movements that impact many activities of daily living such as handwriting or drawing. As a result, when a user having Parkinson disease or otherwise suffering from hand tremors uses digital ink, the resulting drawing or writing is often disjointed, abnormally small and/or cramped. This significantly impacts these users' ability to use digital ink as a form of input or communication, and as such can have a negative impact on the individual's quality of life. Furthermore, it is important for most applications and software developers to provide applications that offer accessibility to differently abled individuals. However, currently available applications that offer digital ink capacity do not provide mechanisms for making digital ink accessible to individuals having hand tremors or other symptoms of Parkinson disease or similar diseases. Thus, there exists a technical problem of inability of current digital ink capturing and processing mechanisms to offer accessibility to users who suffer from hand tremors.

To address these issues and more, in an example, this description provides a technical solution that makes digital ink accessible to user's having a physical disability that makes it difficult for them to use digital ink by applying corrective action to improve graphical input provided by the user. This is achieved by detecting that the user suffers from a disability, assigning a level of hand tremor to the user, and applying one or more correction types based on the level. In some implementations, the correction type and the intensity of the correction is based on the assigned level. The level may be assigned by measuring the number of discontinuities in a given line, measuring the size of the breakpoints, and/or measuring the number and/or size of other irregularities in a given line or shape. In some implementations, after the level is measured, a determination is made as to whether the measured level falls outside a given threshold, and when it does, automatic correction of the drawing or writing is implemented. In some implementations, a notification is provided to the user and/or approval is required before correction is applied. Correction includes connecting breakpoints, smoothing line(s) and/or correcting shapes that require correction. Determining the type of correction needed and implementing the correction may involve the use of one or more machine-learning (ML) models.

As will be understood by persons of skill in the art upon reading this disclosure, benefits and advantages provided by such implementations can include, but are not limited to, a solution to the technical problems of inability of current mechanisms to offer accessibility of digital ink as a form of input to individuals suffering from hand tremors or other symptoms of diseases such as Parkinson disease. The technical solutions provide an efficient, user-friendly and effective mechanism for enabling users who suffer from hand tremors to use digital ink as a form of input by automatically detecting their disability, automatically determining the type and level of correction needed, and automatically applying the correction to correct defects in writing or drawing that are a result of the user's disability. Thus, technical solutions and implementations provided herein optimize and improve the operation and efficiency of capturing and processing digital ink for users having a disability that prevents them for effectively using digital ink. The technical effects at least include (1) automatically detecting disability while the user is providing digital ink input; (2) automatically correct and optimize defects in digital ink input that are caused by the user's disability; and (3) automatically determine the type and level correction required based on the level of hand tremor detected.

As used herein, the term "writing instrument" may refer to any device used to provide digital ink input. This may include an electronic or non-electronic pen, a stylus, or the user's own finger. Furthermore, as used herein, the term "digital ink" may be used to refer to any input received via a writing instrument. The term "tremors" or "hand tremors" may refer to any shaking or other uncontrollable movements of the user's hand that makes it difficult for the user to write or draw.

FIG. 1 illustrates an example system environment 100, upon which aspects of this disclosure may be implemented. In different implementations, the environment 100 includes one or more computing device users, also referred to herein as users, such as a user 110, using a client device 120. Each user can utilize a writing instrument to enter digital ink input via their respective client device. The user 110 can provide the digital ink input while the client device 120 displays any UI screen (e.g., a UI of any application). For example, digital ink input is provided by the user 110 while the client device 120 displays an active UI screen for an application 124. The application 124 is a computer program executed on the client device 120 that configures the device to be responsive to user input to allow the user 110 to interactively view, generate and/or edit digital content. Furthermore, the application 124 is an ink-enabled application. In an example, the application 124 is an application that enables a user to view, generate and/or edit digital content such as digital ink content within an electronic document 150. The application 124 processes the electronic document 150, in response to user input by displaying or otherwise presenting display data, such as a UI which includes the content of the electronic document 150, to the user 110. Examples of suitable applications include, but are not limited to a whiteboard application, word processing application, presentation application, note taking application, text editing application, email application, spreadsheet application, instant messaging application, communications application, web browser application, and the like.

The electronic document 150 can be any electronic file accessible via the client device 120. The electronic document 150 and the term "document" used herein can be representative of any file that can be created via an application executing on a computer device. Examples of documents include, but are not limited to digital drawings, word-processing documents, presentations, spreadsheets, notebooks, email messages, videos, images, and the like. The electronic document 150 may be stored locally on the client device 120, stored in the data store 162 or stored in a different data store and/or server.

Input from a writing instrument is received and processed via a pen digitizer 126. In some implementations, the pen digitizer is a layer of material (e.g., glass) positioned over a display screen of the client device 120. The pen digitizer 126 includes one or more sensors designed to detect movement on the screen. Once movement is detected, the pen digitizer 12 converts the analog touch input into digital signals. The digital signals may include position of the writing instrument and/or other properties about the touch input such as direction of stroke, timing, velocity, tilt and/or pressure. The digital signals that are collected or calculated by the pen digitizer 126 are then transmitted to a graphical operating system 122 (e.g., Microsoft® Windows) for further processing. In some implementations, the graphical operating system 122 transmits the digital signals and/or an image of the digital drawing to an ink processing and accessibility engine 128. The ink processing and accessibility engine 128 may be a part of the application 124 or may be a separate program running on the client device 120. The ink processing and accessibility engine 128 processes the digital signals to detect the presence of a digital ink input, identify a position on the UI screen of the application 124 for the digital ink input received, and collect data related to the digital ink input (e.g., an image of the digital ink input received within a given time period such as the last 5 seconds).

In some implementations, the ink processing and accessibility engine 128 and/or the application 124 includes an ink accessibility element (not shown), in which case, upon detection of the presence of ink input within a given time period, information about the entered ink input is provided to the ink accessibility element for processing. In other implementations, information about the entered ink input is provided to the ink processing and accessibility service 132 of the server 130 via one or more network(s) 140. The information includes pen signals and/or an image of the digital ink input. The server 130 includes and/or is connected to the ink processing and accessibility service 132 for processing the digital ink and/or offering accessibility services. In some implementations, the ink processing and accessibility service 132 provides cloud-based services of the same functions as those provided by the ink processing and accessibility engine 128. In other implementations, some ink processing and/or accessibility services (e.g., those requiring ML models or extensive processing) are performed by the ink processing and accessibility service 132, while other ink processing and/or accessibility services are performed by the local ink processing and accessibility engine 128. In some implementations, initial processing of the ink input is performed by the ink processing and accessibility engine 128, while accessibility services are provided by the ink processing and accessibility service 132. For example, the ink processing and accessibility service 132 examines the digital ink input to identify the user's disability by detecting presence of tremors, measures a level for the tremors, and applies ink correction based on the measured level. At least some of the actions performed by the ink accessibility service 132 and/or ink processing and accessibility engine 128 are achieved by utilizing one or more ML models, as discussed in greater detail with respect to FIG. 2.

One or more ML models implemented by the ink processing and accessibility engine 128 and/or ink processing and accessibility service 132 are trained by the training mechanism 134. The training mechanism 134 may use training data sets stored in the data store 162 of the storage server 160 to provide initial and ongoing training for each of the models. Alternatively, or additionally, the training mechanism 134 uses training datasets from elsewhere. In some implementations, the training mechanism 134 uses labeled training data to train one or more of the models via deep neural network(s) or other types of ML models. The initial training may be performed in an offline stage.

As a general matter, the methods and systems described herein may include, or otherwise make use of one or more ML model to analyze image data, identify shapes and/or letters, determine associations between shapes, and determine how to correct a digital ink input to correspond with the user's desired input. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in images, determine associations between various shapes or objects, and determine when and how to correct a digital ink input. Such training is made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model is referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model is varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting trained ML models may be selected based on factors such as, but not limited to, accuracy, computational efficiency, and/or power efficiency. In some implementations, a single trained ML model is produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models or analyzing documents to generate titles, care is taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 includes the server 160 which is connected to or includes the data store 162 which functions as a repository in which databases relating to training models, documents, and digital ink input can be stored. Although shown as a single data store, the data store 162 may be representative of multiple storage devices and data stores which are accessible by one or more of the ink processing and accessibility engine 128, ink processing and accessibility service 132, training mechanism 134, and/or client device 120.

The network 140 is a wired or wireless network or a combination of wired and wireless networks that connect one or more elements of the system 100. The network 140 may have numerous different configurations including a star configuration, token ring configuration, or other configurations. For instance, the network 140 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 140 may also be coupled to or include portions of a telecommunications network for sending data in a variety of different communication protocols. In one implementation, the network 140 includes Bluetooth® communication networks or a cellular communications network for sending and receiving data including via short messaging service (SMS), multimedia messaging service (MMS), hypertext transfer protocol (HTTP), direct data connection, WAP, email, and the like.

In some implementations, the server 130 is configured to perform one or more steps of the methods disclosed herein via for example the ink processing and accessibility service 132. Furthermore, the server 130 may include one or more online applications 112 that may be accessed via the client device 120 and upon which digital ink input can be received and processed.

The client device 120 is representative of a plurality of client devices that may be present in the system. The client device 120 includes virtual or physical computer processors, memories, communication interface(s)/device(s), etc., which, along with other components of the client device 120, are coupled to the network 140 for communication with other entities of the system 100. For example, the client device 120, accessed by the user 110 sends and receives data (e.g., digital ink input) to the server 130 and/or the server 160 for processing and/or storage. Each client device 120 is a type of personal, business or handheld computing device having or being connected to input/output elements that enable a user to interact with a writing instrument to provide digital ink input. Examples of suitable client devices 120 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 6 and 7. It should be noted that although the client device 120 is shown as being connected to the network 140, it could be disconnected and operate independently from a network environment, at least temporarily. For example, the ink processing and accessibility engine 128 and/or the application 124 may be used to perform all operations relating to processing ink input and providing digital ink accessibility for the client device 120.

Figure 2:
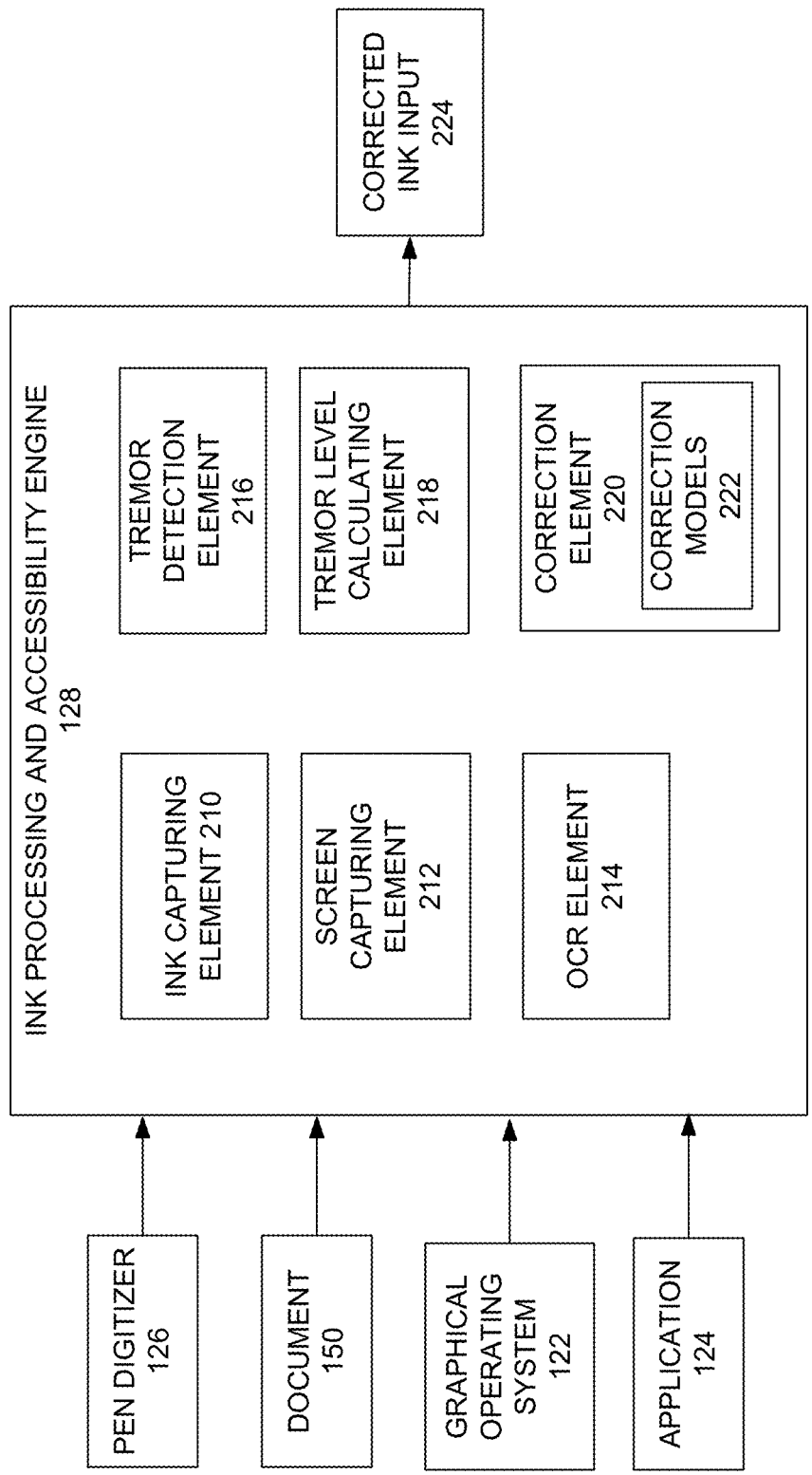
FIG. 2 depicts an example of some of the elements of an ink processing and accessibility element upon which aspects of this disclosure are implemented.

FIG. 2 depicts an example of some of the elements of an ink processing and accessibility element upon which aspects of this disclosure are implemented. In some implementations, the ink processing and accessibility engine 128 includes an ink capturing element 210, screen capturing element 212, OCR element 214, tremor detection element 216, tremor level calculating element 218, and correction element 220. Data from the pen digitizer 126, document 150, graphical operating system 122 and/or application 124 is transmitted to the ink processing and accessibility engine 128 for processing.

In some implementations, upon detecting digital ink input from a writing instrument, data relating to the input is transmitted directly form the pen digitizer 126 to the ink processing and accessibility engine 128. In alternative implementations, upon detecting digital ink input from a writing instrument, data related to the digital ink input is transmitted to the graphical operating system 122, which in turn transmits the data to the ink processing and accessibility engine 128. In some implementations, the graphical operating system 122 performs some pre-processing on the digital ink input before transmitting the data to the ink processing and accessibility engine 128. Furthermore, in some implementations, data related to the digital ink input is transmitted to the ink processing and accessibility engine 128 once a determination is made that entering digital ink input has been completed for a given ink portion (e.g., once the writing instrument is lifted off of the screen for a pre-determined amount of time). In some implementations, processing an entered digital ink input occurs once a user request is received. For example, the user may transmit a request (e.g., via a gesture or by invoking a menu option) to receive accessibility services for an entered digital ink input. Alternatively and/or additionally, processing a digital ink input occurs automatically upon detection of receipt of digital ink input for a given time period (e.g., digital ink input has been received for the last 5 seconds).

Once digital ink input is detected and a determination is made to process the entered digital ink input for accessibility functionalities, data relating to the digital ink input is transmitted to the to the ink processing and accessibility engine 128. The processing and accessibility engine 128 may then retrieve data related to the document 150 upon which the digital ink input was entered and/or data related to the application 124 which displayed the document 150 or which displayed a UI screen on which the digital ink input was entered. The data may include a portion of the document or UI screen on which the digital ink input was entered (e.g., an image of the UI screen or document page, etc.). The data may also include timing information related to the amount of time it took to receive the digital ink input. This may be provided in increments (e.g., which parts of the ink input were provided in each of the last 10, 5 seconds, or which parts were provided since the last processing of the digital ink input and the length of time it took to receive the input).

In some implementations, the digital ink input is provided to the ink capturing element 210. The ink capturing element 210 may receive and perform some preprocessing on the digital ink input. For example, the ink capturing element 210 receives the digital ink input and determines the type of ink input received to determine if an image of the digital ink input should be captured. The type of ink received includes a writing (e.g., entered characters), a drawing, or highlighting. Depending on the type of ink input, the ink capturing element 210 can determine whether the digital ink input should receive accessibility services. For example, when the ink type is circling or highlighting a portion of an underlying content, the ink capturing element 210 determines that accessibility services may not be needed for this type of digital ink. However, when the ink type is a writing or a drawing, then the ink capturing element 210 determines that accessibility services may be needed. Identifying type of digital ink may also be useful in determining how to correct the digital ink input, as further discussed below.

When the digital ink input is writing, the ink processing and accessibility engine 128 may make use of an optical character recognition (OCR) element 214 to recognize the characters. This may be done to help determine how to correct the digital ink input as further discussed below. Furthermore, the screen capturing element 212 is utilized to capture an image of the digital ink input. The image may be of the entire UI screen or of a portion of the UI screen on which the digital ink input was entered.

The captured ink and/or captured image are then transmitted to the tremor detection element 216 to determine if the digital ink input indicates that the user suffers from tremors. The tremor detection element 216 examines the digital ink input to detect the presence of discontinuities in the paths (e.g., breakpoints in a continuous path), cramped paths, and/or writing/drawing that is too close to another line or is too small. In some implementations, this is done in real time as the user is providing digital ink input and is achieved by examining the image of the digital ink input that was received in a given recent time period (e.g., the last 3 to 5 seconds). Thus, the screen capture element 212 may use the information provided by the pen digitizer 126 and/or graphical operating system 122 to capture an image of a newly received (e.g., unprocessed) portion of the digital ink input (e.g., in the last 5 seconds) and provide this image and/or information about the length of time during which the digital ink input was provided to the tremor detection element 216 for processing. In other implementations, processing is done after user receiving a user request and/or when a determination is made that the user is done with at least a portion of the digital ink input. In such implementations, an image of the unprocessed digital ink input is also captured and may be sent along with timing information to the tremor detection element 216 for processing.

The tremor detection element 216 examines the digital ink input to detect discontinuities in the drawn paths. Discontinuities may be any breaks in a drawn line where the size of the break is larger than a given threshold (e.g., 5 pixels). In some implementations, this involves image processing and includes examining the pixels in the image for specific parameters (e.g., breaks in a continuous line), lines that are too close to each other, writing or drawing that is smaller than a given threshold, and the like. Once one or more discontinuities, cramped paths, writing/drawing that is too close to another line or too small is identified, the tremor detection element 216 detects potential presence of tremors and transmits a request to the tremor level calculating element 218 to measure the tremor level.

The tremor level calculating element 218 examines the image of the digital ink input along with the timing information to detect the number of discontinuities and/or the number of other indicators of potential tremors such as closeness of distinct lines to each other, the size of written characters, the number of times a line appears zigzagging, and the like within a given time period. Based on the number of these occurrences within a given time period, the tremor level calculating element 218 assigns a tremor level to the digital ink input. The level may be based on a predetermined range, with a lower number indicating a lower tremor level and a higher number indicating a higher tremor level. For example, a range of 0 to 4 with 0 indicating no tremors and 4 indicating sever tremors is used, in some implementations.

When the calculated tremor level exceeds a given threshold (e.g., level 2 or higher), the ink processing and accessibility engine 128 determines that correction of the digital ink input may be required. In some implementations, at this stage, the ink processing and accessibility engine 128 provides a notification to the user that the digital ink input may need correction and enables the user to choose whether or not to apply the correction. Thus, the ink processing and accessibility engine 128 transmits notification data to the application to be displayed to the user on the application 124 for notifying the user. In other implementations, when the tremor level exceeds a given threshold, the ink processing and accessibility engine 128 automatically corrects the digital ink input. For example, when the tremor level is measured as being above 3 (in a 0 to 4 scale), in such implementations, the ink processing and accessibility engine 128 automatically corrects the digital ink input. In an example, as the user is drawing or writing, the drawing or writing is corrected/enhanced. Automatic correction may require prior user consent or request (e.g., via a settings menu).

Correction of the digital ink input is achieved via the correction element 220. The correction element 220 examines the digital ink input (e.g., the image) to determine how to enhance the digital ink input. This may involve the use or one or more ML models such as the correction models 222. For example, the correction element 220 uses the ML models 222 to determine what type of correction should be used on the received digital ink input. Examples of possible corrections include joining strokes, trimming strokes, straightening strokes and smoothing strokes. In an example, if the digital ink input includes a discontinuity where two lines in a given path do not completely meet and another place where a line extend beyond a point of intersection, the correction models 222 automatically determine that the unconnected lines should be joined and the intersected lines should be trimmed.

To join two strokes, the correction element 220 may first identify unconnected endpoints by examining vector information to identify stroke endpoints in a selected area. If two stroke endpoints are within a predetermined distance from each other, then those endpoints may be identified as an unconnected endpoint pair. This may have already been performed as part of detecting discontinuities in lines. Once unconnected endpoints are identified, they are joined by drawing a line from one identified unconnected endpoint to the other in a pair of identified unconnected endpoints. In some implementations, this involves calculating the average of the position of the identified endpoints and moving all the endpoints to those coordinates.

Trimming strokes involves first identifying two or more vector strokes, in a selected area of the digital ink input, that have intersected but include portions that go beyond the point of intersection. If those strokes have endpoints that are located within the selected area, then they are identified as having undesired extensions that should be trimmed. The undesired extensions are then removed by deleting the part of each stroke that goes from the point of intersection to the identified endpoint. Straightening strokes may involve straightening the stroke segments contained in a selected area by removing all intermediate points between two strokes that intersect with the selected area. Performing a smoothing operation may be done by first identifying the endpoints where any drawing lines intersect with a selected area and/or if any points of intersection exists between multiple strokes. The identified points are then used as endpoints for drawing a straight line from one endpoint to a next closes endpoint. In an implementation, this involves pairing the identified endpoints based on their distance from each other and/or other factors.

To determine how to correct the digital ink input (e.g., what type of correction operation to perform on which parts of the digital ink input), the correction element 220 makes use of the correction models 222. The correction models 222 may examine the user's prior history of ink input and/or other user's prior history of ink input to determine how to correct the digital ink input. Furthermore, the correction models 222 examine parameters such as the type of document on which the digital ink input was received, the location of the digital ink input on the document, the type of application, the type of digital ink input, and the like. For example, if the digital ink input is provided on a signature line of a document, the correction models 222 detect that the ink input is meant to be the user's signature and may examine other user data such as the user's name to better identify the character the user intended to write. Based on this determination, the correction models 222 can determine how to correct the digital ink input to achieve the desired result. In other implementations, the correction models 222 examine the shape of the digital ink input to predict the shape the user intended to draw and correct the digital ink input to correspond with the intended shape. In making this determination, the correction models 222 may take the context of the document and the user's prior history of drawings and/or corrections into consideration. In determining how to correct digital ink input that includes characters (e.g., writing), output from the OCR element 214 may be taken into account to first identify the potential characters the user intended to write. Once corrections are made, the corrected ink input 224 is provided as an output to the application 124.

It should be noted that while FIG. 2 depicts the ink processing and accessibility engine 128 as including the ink capturing element 210, screen capturing element 212, OCR element 214, tremor detection element 216, tremor level calculating element 218, and correction element 220, one or more of these elements may be included in the ink processing and accessibility service 132 of FIG. 1. For example, the ML models 222 may be too large to store locally and as such may be provided as part of the ink processing and accessibility service 132. In other implementations, a light versions of the ML models 222 is provided locally, while more complex versions are made available via the ink processing and accessibility service 132. Furthermore, the ink processing and accessibility service 132 may include the same or similar elements as the ink capturing element 210, screen capturing element 212, OCR element 214, tremor detection element 216, tremor level calculating element 218, and correction element 220 to provide cloud-based ink processing and accessibility services.

Figure 3A:
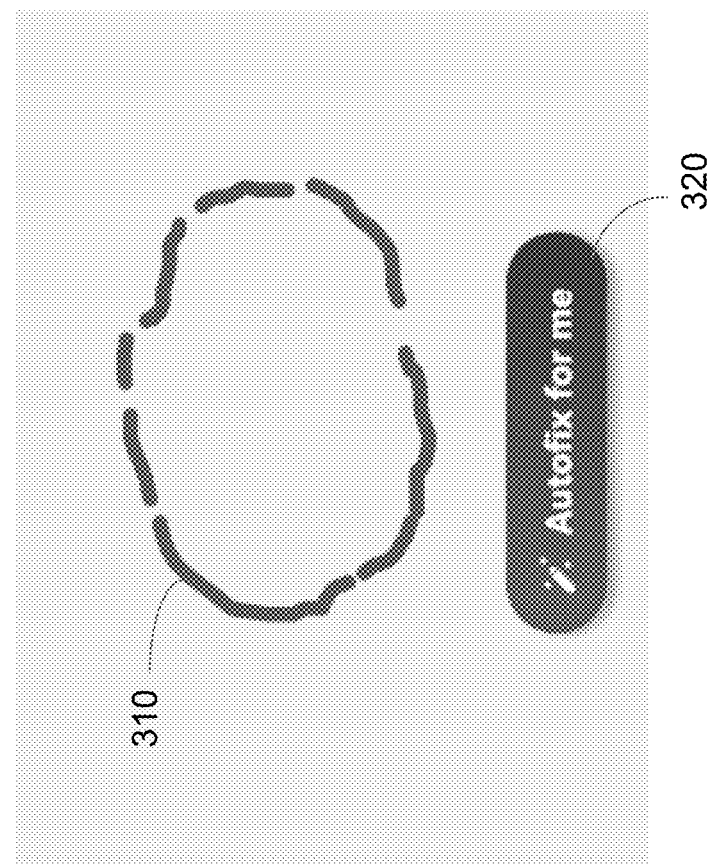
FIGS. 3A-3B depict example UI screens for receiving digital ink input and providing digital ink input correction.
Figure 3B:
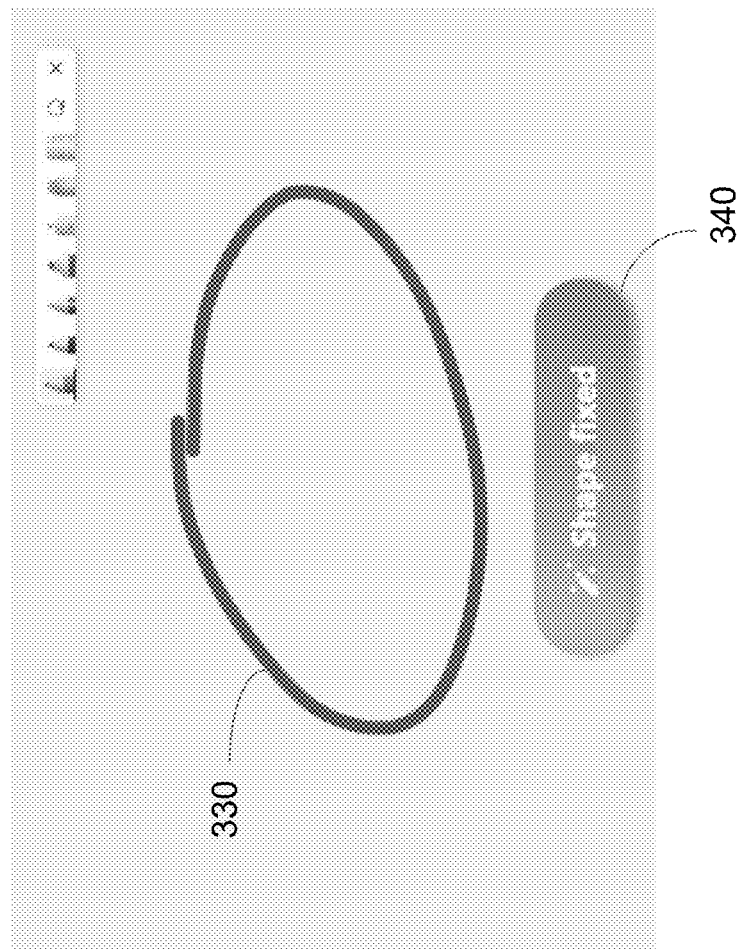

FIGS. 3A-3B depict example UI screens for receiving digital ink input and providing ink input correction. FIG. 3A depicts a UI screen 300A of an application (e.g., a whiteboard application) displaying a digital ink drawing 310 drawn by a user that suffers from hand tremors. The drawing may have been provided using a writing instrument, a mouse or the user's finger. For example, the UI screen 300A may be displayed on a touch-enabled screen upon which the user can write using a writing instrument. As depicted, the digital ink drawing 310 includes multiple discontinuities, as well as jagged and uneven portions. Based on these indications, an ink processing and accessibility engine examining the digital ink drawing 310 may determine that the user drawing the digital ink drawing 310 has a high level of tremors. As a result, the UI element 320 is displayed on the UI screen 300A to enable the user to automatically correct the digital ink drawing 310. The UI element 320 may be displayed once the user is done with the digital ink drawing 310 (e.g., the user lifts off the writing instrument for a given time period) or it may be displayed as the user is drawing, once a determination is made that correction may be needed. In some implementations, the notification provides more information and/or more options. For example, the notification may indicate that the drawing includes multiple discontinues, inform the user that the detected shape is a circle, and asks the user whether they are interested in automatically correcting the drawing to a circle. In alternative implementations, the digital ink drawing 310 is automatically corrected without user input.

Once the user selects the UI element 320, the digital ink drawing 310 is corrected by joining strokes, smoothing strokes, and straightening strokes as needed. This may involve first determining that the user intended to draw a circle and then determining the types of corrections needed to convert the digital ink drawing 310 to a circle. FIG. 3B depicts a UI screen 300B that displays the corrected digital ink drawing 330. As shown, the jagged and discontinued lines of the digital ink drawing 310 are corrected to display the more smooth and aesthetically pleasing digital ink drawing 330 which more closely resembles a circle. The UI screen 300B also displays a UI element 340 that notifies the user that their drawing was fixed.

Figure 4A:
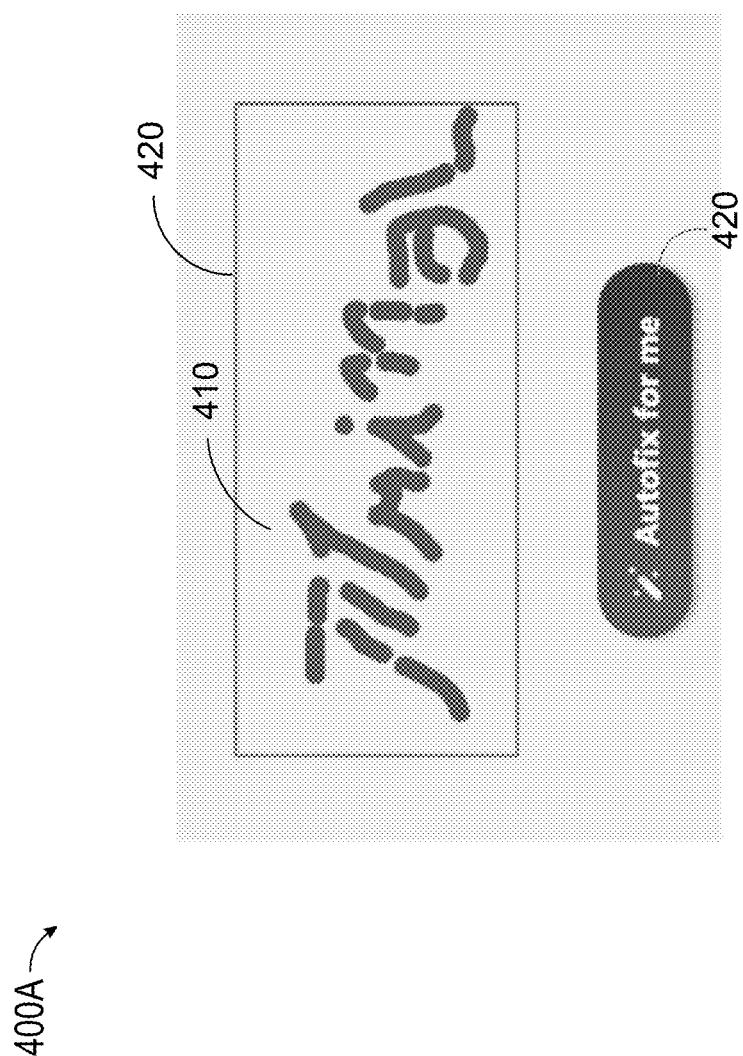
FIGS. 4A-4B depict example UI screens for receiving digital ink writing input and providing ink input correction.
Figure 4B:
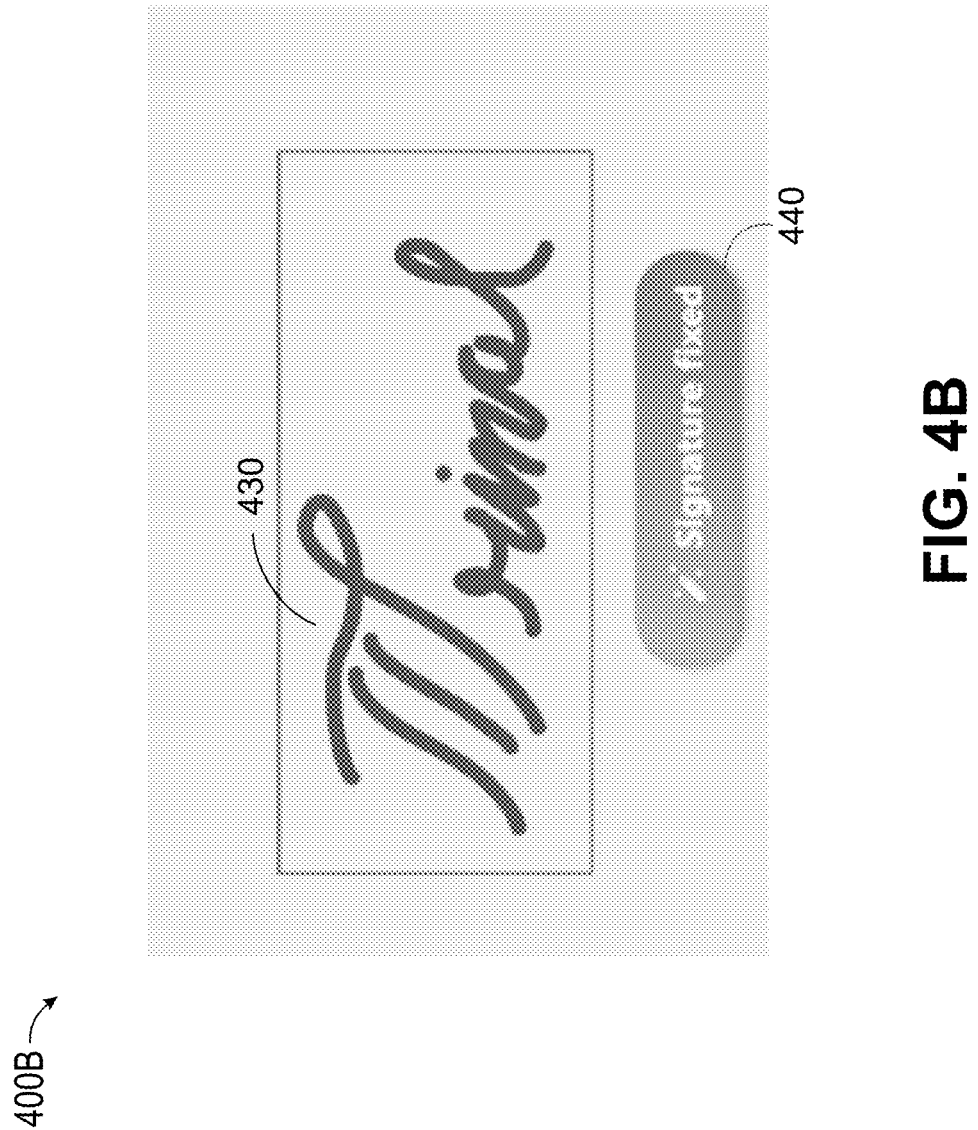

FIGS. 4A-4B depict example UI screens for receiving digital ink writing input and providing ink input correction. FIG. 4A depicts a UI screen 400A of an application (e.g., a word processing application) displaying a digital ink writing 410 drawn by a user that suffers from hand tremors. The writing can be provided using a writing instrument, a mouse or the user's finger. The UI screen 400A may be displayed on a touch-enabled screen upon which the user can write using a writing instrument. In an example, the UI screen 400A screen displays a portion of a document that includes a UI element 420 (e.g., text input box) for providing a signature. The document is displayed by an ink-enabled application that allows the user to utilize digital ink. The user can thus utilize a writing instrument to sign in the UI element 420 by writing their name. However, for a user that suffers from hand tremors, using digital ink input to sign the document is challenging, as the resulting ink input may include many discontinuities. For example, as depicted, the digital ink writing 410 includes multiple discontinuities. Based on these discontinuities, an ink processing and accessibility engine implementing techniques disclosed herein examines the digital ink writing 410 and determines that the user providing the digital ink writing 410 has a high level of tremors. As a result, the UI element 420 is displayed on the UI screen 400A to enable the user to automatically correct the digital ink writing 410.

In some implementations, the UI element 420 is displayed once the user is done with the digital ink writing 410 (e.g., the user lifts off the writing instrument for a given time period). Alternatively, the UI element 420 is displayed as the user is writing, once a determination is made that correction is needed. In some implementations, once it is determined that correction is required, more information and/or more options are presented to the user. For example, a notification may be displayed that indicates the writing includes multiple discontinues and asks the user whether they are interested in automatically correcting the writing. In alternative implementations, the digital ink drawing 410 is automatically corrected without user input.

In some implementations, when the digital ink input includes textual content, an OCR engine is used to detect the characters. Furthermore, document contextual data and/or user data may be used to detect the user's intended textual input. For example, when the digital ink input is entered in a UI element intended for a signature, the system determines that the writing is the user's signature. The user's name can then be retrieved from user data (e.g., user profile data) and used to infer the intended characters in the digital ink writing 410. The intended characters can then be used to determine how to correct the digital ink writing 410.

Once the user selects the UI element 420, the digital ink writing 410 is corrected by joining strokes, smoothing strokes, and straightening strokes as needed to achieve a desired look for the characters. This may involve user one or more ML models as discussed before. FIG. 4B depicts a UI screen 400B that displays the corrected digital ink writing 430. As shown, the jagged and discontinued lines of the digital ink writing 410 are corrected to display a more smooth, aesthetically pleasing and legible digital ink writing 430. The UI screen 400B also displays a UI element 440 that notifies the user that their writing was fixed. In some implementations, UI elements (not shown) is displayed to enable the user to accept or reject the correction. When a user accepts or rejects a correction, this information may be collected and used to further train the models that provide correction to improve the models. Thus, the techniques disclosed herein quickly and efficiently determine when a user needs assistance in utilizing digital ink input and automatically offer and/or provide accessibility in response to the determination in a user-friendly manner.

Figure 5:
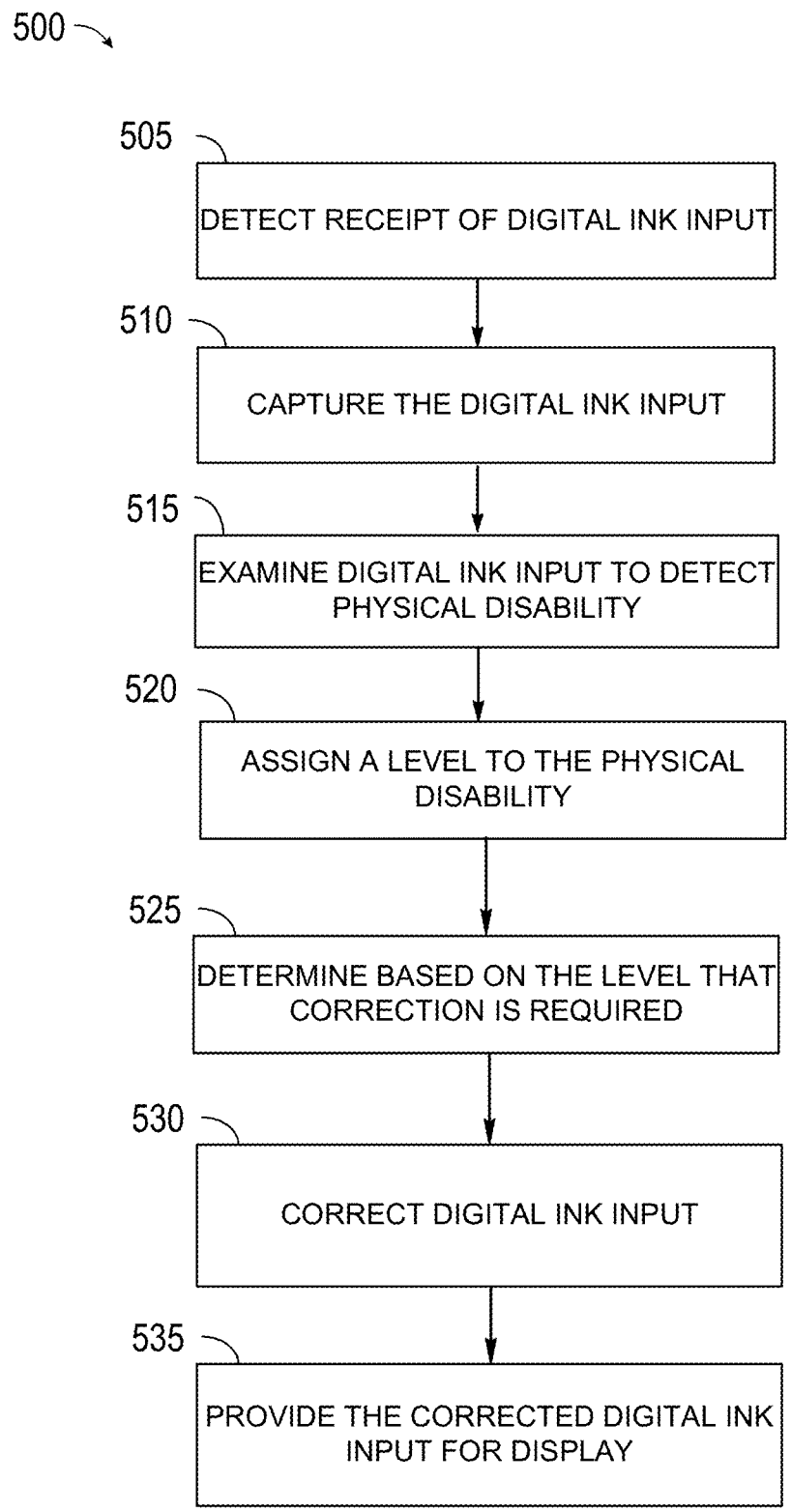
FIG. 5 is a flow diagram showing an example method for providing accessibility in digital ink use.

FIG. 5 is a flow diagram showing an example method for providing accessibility in digital ink use. In an example, one or more steps of method 500 are performed by an application (e.g., application 124 or 112 of FIG. 1), pen digitizer (e.g., pen digitizer 126 of FIG. 1), and graphical operating system (e.g., graphical operating system 122 of FIG. 1). Other steps of method 500 may be performed by an ink processing and accessibility engine or service (e.g., ink processing and accessibility engine 128 or ink processing and accessibility service 132 of FIG. 1).

At 505, the method 500 begins by detecting receipt of digital ink input on a UI screen. The UI screen is a UI screen of an application being executed on a client device and may be an ink-enabled application. This may occur when the user begins entering digital ink input on the UI screen via a writing instrument. Detecting and processing of the digital ink input occurs in real time in some implementations. Alternatively, detecting receipt of digital ink input may occur once the user has finished entering digital ink input and/or has submitted a request for processing the digital ink input.

Once the digital ink input is detected, the digital ink input is captured, at 510. This may involve capturing an image of the digital ink input or capturing an image of the portion of the digital ink input which was received since the last processing of the digital ink input or the portion received within a given time period (e.g., the last 5 seconds). After the digital ink input is captured, the digital ink input is examined to detect a physical disability in the user, at 515. This is done by examining discontinuities or irregularities in the captured digital ink input. Discontinuities may refer to breakpoints in a line or path of the digital ink input in a location where a breakpoint is not expected. Irregularities refer to two lines being too close to each, two lines intersecting and extending beyond the point of intersection, zigzagged lines, writing that is too small or too cramped and the like. The presence of one or more of these discontinuities or irregularities indicates the possibility of presence of a physical disability in the user. The physical disability may be a disability that causes hand tremors. In an example, the physical disability is caused by Parkinson disease.

Upon detecting the physical disability, method 500 proceed to assign a level for the physical disability, at 520. This is achieved by examining the number of discontinuities and/or irregularities in the digital ink input within a given time period. The level may be based on a predetermined scale (e.g., 0 to 4 or 1 to 10), where lower levels indicate fewer tremors and higher levels indicate higher tremors. The level is assigned based on an association between the size and/or number of discontinuities and/or irregularities in the digital ink input within a given time period with each level of the predetermined scale.

Once the level is assigned, method 500 proceeds to determine based on the level that a correction to the digital ink input is required, at 525. This is achieved by comparing the assigned level to a threshold value to determine if the level exceeds a given threshold value (e.g., for a scale of 0 to 4, if the level exceeds 2). When the level exceeds the threshold value, this indicates that the level of tremors are high enough to require correction.

When it is determined that correction is required, method 500 proceeds to automatically correct the digital ink input, at 530. This may involve correcting the identified discontinuities and/or irregularities in the digital ink input. In some implementations, this is achieved by utilizing an ML model that receives the digital ink input and/or other data such as user history data, document contextual data, etc. as an input and provides a corrected version of the digital ink input as an output. When the digital ink input is a writing, correction may include detecting the characters that the user intended to write and correcting the digital ink input in correspondence with the detected characters. This may include use of an OCR engine.

In some implementations, before the digital ink input is corrected, a notification is presented to the user and/or the user is enabled to choose whether or not to correct the digital ink input. In alternative implementations, the digital ink input is corrected automatically and/or in real-time as the user is providing ink input. Such implementations may require real-time processing of the digital ink input.

Once the digital ink input has been corrected, method 500 proceeds to provide the corrected digital ink input, at 535. In an example, the corrected digital ink input is transmitted back to the application that is displaying the digital ink input, which in turn, displays the corrected digital ink input instead of the original received digital ink input. In some implementations, the UI screen displays a notification that indicates the digital ink input was corrected. The user may then be able to accept or reject the correction.

Figure 6:
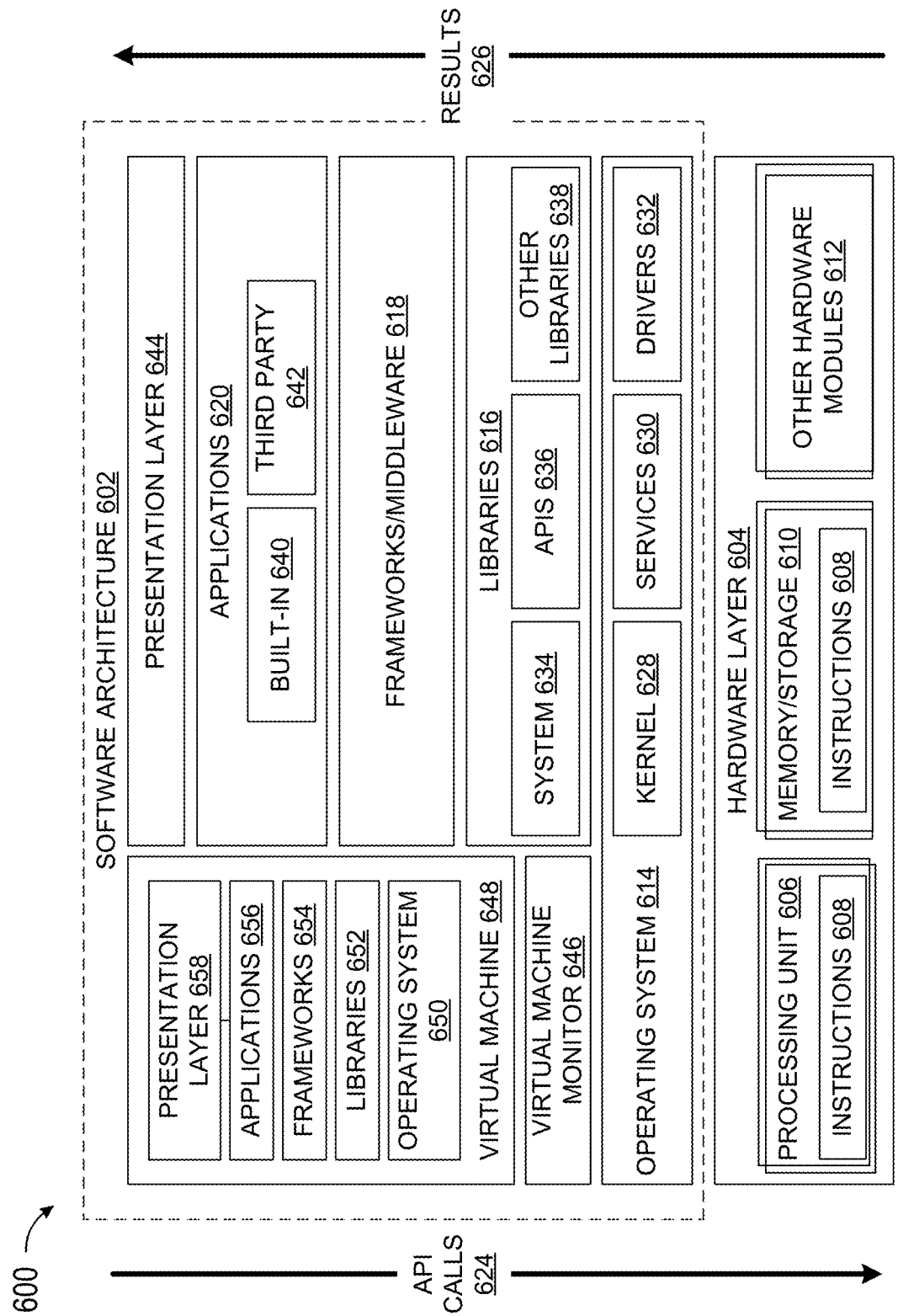
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
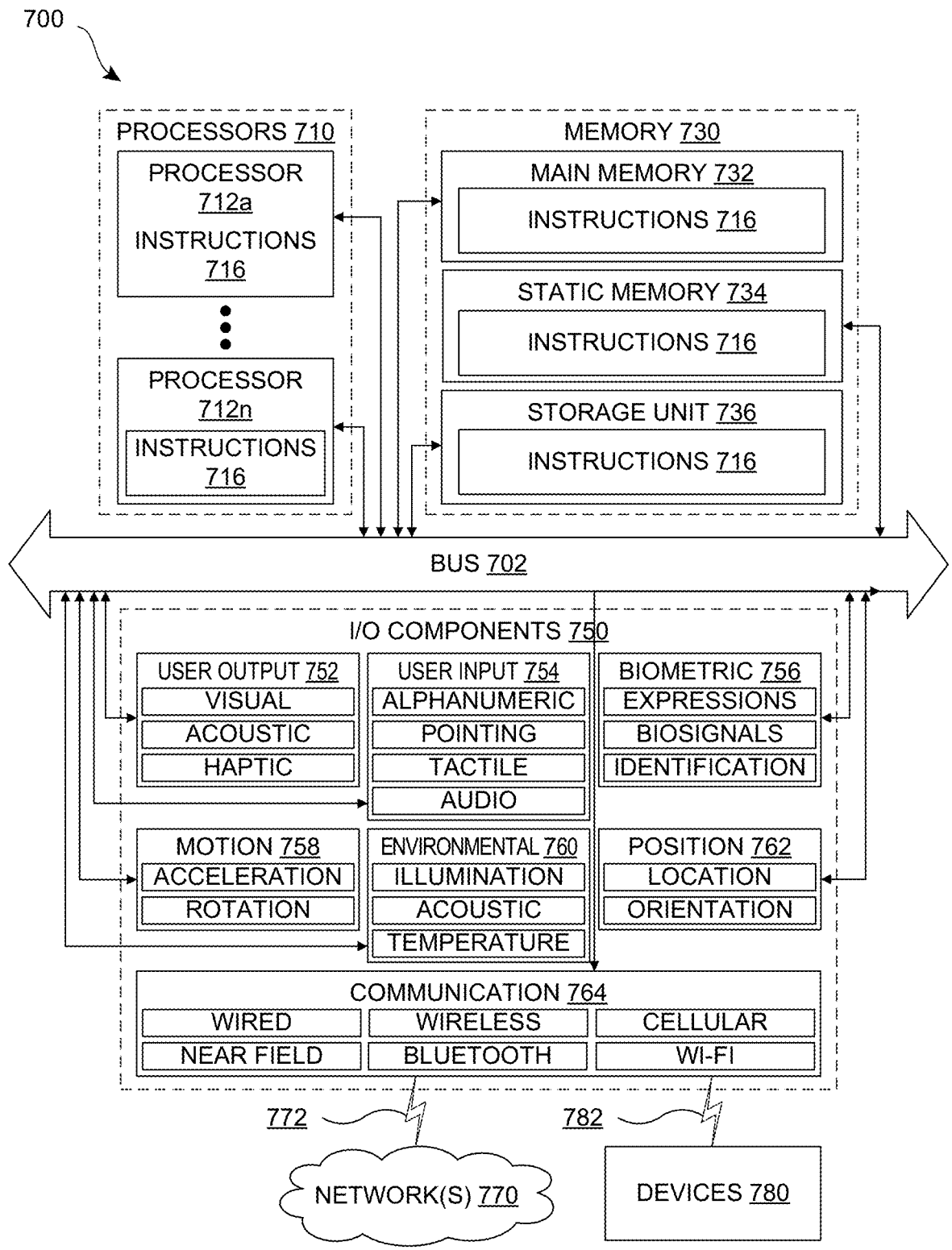
FIG. 7 is a block diagram illustrating components of an example machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
detecting receipt of a digital ink input on a user interface (UI) screen, the digital ink input being provided by a user;
examining the digital ink input to detect a physical disability of the user;
assigning a level for the physical disability based on at least one of a number of discontinuities in the digital ink input, a size of the discontinuities in the digital ink input and irregularities in the digital ink input;
determining based on the level that the digital ink input requires correction; and automatically applying a correction to the digital ink input to correct the digital ink input.

Item 2. The device of item 1, wherein determining based on the level that the digital ink input requires correction includes determining that the level exceeds a threshold.

Item 3. The device of any of items 1 or 2, wherein automatically applying the correction to the digital ink input includes applying a correction type that includes at least one of joining one or more discontinued strokes of the digital ink input to correct discontinuities, smoothing one or more strokes of the digital ink input, trimming one or more strokes of the digital ink input, and straightening one or more strokes of the digital ink input.

Item 4. The device of any preceding item, wherein automatically applying the correction to the digital ink input includes providing the digital ink input as an input to a machine-learning model and receiving the corrected digital ink input as an output of the machine-learning model.

Item 5. The device of any preceding item, wherein the memory comprises executable instructions that, when executed by the processor, further cause the device to perform functions of:
upon determining that the digital ink input requires correction, displaying a user interface element that enables the user to transmit a request for correcting the digital ink input; and
applying the correction, upon receiving the request for correcting the digital ink input.

Item 6. The device of any preceding item, wherein the physical disability includes presence of tremors.

Item 7. The device of item 6, wherein assigning the level for the physical disability includes assigning a level for the tremors.

Item 8. The device of any preceding item, wherein the digital ink input includes at least one of a writing or a drawing.

Item 9. A method for providing accessibility for digital ink comprising:
detecting digital ink input on a user interface (UI) screen, the digital ink input being received via a writing instrument used by a user within a given time period;
capturing an image of the digital ink input;
examining the image of the digital ink input to detect tremors in the user;
assigning a level to the tremors based on at least one of discontinuities or irregularities in the digital ink input within the given time period;
determining based on the level that the digital ink input requires correction; and
applying a correction to the digital ink input to correct the digital ink input.

Item 10. The method of item 9, wherein examining the image of the digital ink input and assigning the level to the tremors occurs in real time.

Item 11. The method of any of items 10 or 11, further comprising providing the corrected digital ink input for display on the UI screen.

Item 12. The method of item 11, further comprising displaying at least one of a first UI element that enables the user to accept the corrected digital ink input and a second UI element that enables the user to reject the corrected digital ink input.

Item 13. The method of item 12, further comprising collecting data about acceptance or rejection of the corrected digital ink input and using the collected data to train a machine-learning model used to correct the digital ink input.

Item 14. The method of any of items 9-13, wherein applying a correction to the digital ink input includes providing the digital ink input to a trained machine-learning model for providing correction to the digital ink input and receiving a corrected digital ink input as an output from the machine-learning model.

Item 15. The method of any of items 9-14, assigning the level to the tremors includes assigning the level based on a predetermined scale by examining at least one of a number of the discontinuities or irregularities in the digital ink input within the given time period, and a size of the discontinuities or irregularities.

Item 16. The method of any of items 9-15, wherein applying the correction to the digital ink input includes applying a correction type that includes at least one of joining one or more discontinued strokes of the digital ink input to correct discontinuities, smoothing one or more strokes of the digital ink input, trimming one or more strokes of the digital ink input, and straightening one or more strokes of the digital ink input.

Item 17. The method of any of items 9-16, wherein the digital ink input includes at least one of a writing or a drawing and the correction is applied based on a type of the digital ink input.

Item 18. A non-transitory computer readable medium on which are stored instructions that when executed cause a programmable device to perform functions of:

detecting receipt of digital ink input on a user interface (UI) screen, the digital ink input being provided by a user;

capturing the digital ink input;

examining the digital ink input to detect tremors in the user;

assigning a level to the tremors based on the digital ink input;

determining based on the level that the digital ink input requires correction;

providing the digital ink input to a trained machine-learning model for providing correction to the digital ink input;

receiving a corrected digital ink input as an output from the machine-learning model; and providing the corrected digital ink input for display.

Item 19. The non-transitory computer readable medium of item 18, wherein determining based on the level that the digital ink input requires correction includes determining that the level exceeds a threshold.

Item 20. The non-transitory computer readable medium of any of items 18 or 19, wherein the instructions further cause the programmable device to perform functions of:

upon determining that the digital ink input requires correction, displaying a user interface element that enables the user to transmit a request for correcting the digital ink input; and applying the correction, upon receiving the request for correcting the digital ink input.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   a processor; and
   a memory in communication with the processor, the memory comprising executable instructions that, when executed by the processor, cause the device to perform functions of:
   detecting receipt of a digital ink input on a user interface (UI) screen, the digital ink input being provided by a user;

determining a type of ink from the digital ink input, the type of ink including one of writing, drawing, highlighting, or circling;

examining the digital ink input to detect a physical disability of the user;

assigning a level for the physical disability based on at least one of a number of discontinuities in the digital ink input, a size of the discontinuities in the digital ink input and irregularities in the digital ink input;

determining based on the level and the type of ink that the digital ink input requires correction; and automatically applying the correction responsive to the type of ink to the digital ink input to correct the digital ink input.

2. The device of claim 1, wherein determining based on the level that the digital ink input requires the correction includes determining that the level exceeds a threshold.

3. The device of claim 1, wherein automatically applying the correction to the digital ink input includes applying a correction type that includes at least one of joining one or more discontinued strokes of the digital ink input to correct discontinuities, smoothing the one or more strokes of the digital ink input, trimming the one or more strokes of the digital ink input, and straightening the one or more strokes of the digital ink input.

4. The device of claim 1, wherein automatically applying the correction to the digital ink input includes providing the digital ink input and the type of ink as an input to a machine-learning model and receiving the corrected digital ink input as an output of the machine-learning model.

5. The device of claim 1, wherein the memory comprises executable instructions that, when executed by the processor, further cause the device to perform functions of:

upon determining that the digital ink input requires correction, displaying a user interface element that enables the user to transmit a request for correcting the digital ink input; and applying the correction, upon receiving the request for correcting the digital ink input.

6. The device of claim 1, wherein the physical disability includes presence of tremors.

7. The device of claim 6, wherein assigning the level for the physical disability includes assigning a level for the tremors.

8. The device of claim 1, wherein the digital ink input includes at least one of a writing or a drawing.

9. A method for providing accessibility for digital ink comprising:

detecting digital ink input on a user interface (UI) screen, the digital ink input being received via a writing instrument used by a user within a given time period;

capturing an image of the digital ink input;

determining a type of ink from the digital ink input, the type of ink including one of writing, drawing, highlighting, or circling;

examining the image of the digital ink input to detect tremors in the user;

assigning a level to the tremors based on at least one of discontinuities or irregularities in the digital ink input within the given time period;

determining based on the level and the type of ink that the digital ink input requires correction; and applying a correction responsive to the type of ink to the digital ink input to correct the digital ink input.

10. The method of claim 9, wherein examining the image of the digital ink input and assigning the level to the tremors occurs in real time.

11. The method of claim 10, further comprising providing the corrected digital ink input for display on the UI screen.

12. The method of claim 11, further comprising displaying at least one of a first UI element that enables the user to accept the corrected digital ink input and a second UI element that enables the user to reject the corrected digital ink input.

13. The method of claim 12, further comprising collecting data about acceptance or rejection of the corrected digital ink input and using the collected data to train a machine-learning model used to correct the digital ink input.

14. The method of claim 9, wherein applying the correction to the digital ink input includes providing the digital ink input to a trained machine-learning model for providing the correction to the digital ink input and receiving a corrected digital ink input as an output from the machine-learning model.

15. The method of claim 9, assigning the level to the tremors includes assigning the level based on a predetermined scale by examining at least one of a number of the discontinuities or the irregularities in the digital ink input within the given time period, and a size of the discontinuities or the irregularities.

16. The method of claim 9, wherein applying the correction to the digital ink input includes applying a correction type that includes at least one of joining one or more discontinued strokes of the digital ink input to correct discontinuities, smoothing the one or more strokes of the digital ink input, trimming one or more strokes of the digital ink input, and straightening the one or more strokes of the digital ink input.

17. A non-transitory computer readable medium on which are stored instructions that when executed cause a programmable device to perform functions of: detecting receipt of digital ink input on a user interface (UI) screen, the digital ink input being provided by a user;

capturing the digital ink input;

determining a type of ink from the digital ink input, the type of ink including one of writing, drawing, highlighting, or circling;

examining the digital ink input to detect tremors in the user;

assigning a level to the tremors based on the digital ink input;

determining based on the level and the type of ink that the digital ink input requires correction;

providing the digital ink input and the type of ink to a trained machine-learning model for providing correction to the digital ink input;

receiving a corrected digital ink input as an output from the machine-learning model; and providing the corrected digital ink input for display.

18. The non-transitory computer readable medium of claim 17, wherein determining based on the level that the digital ink input requires the correction includes determining that the level exceeds a threshold.

19. The non-transitory computer readable medium of claim 17, wherein the instructions further cause the programmable device to perform functions of:

upon determining that the digital ink input requires the correction, displaying a user interface element that enables the user to transmit a request for correcting the digital ink input; and applying the correction, upon receiving the request for correcting the digital ink input.

\* \* \* \* \*